United States Patent [19]
Lee

[11] 3,896,550
[45] July 29, 1975

[54] JAW MOVEMENT SIMULATOR

[76] Inventor: Robert L. Lee, 22937 Grand Terrace Rd., Colton, Calif. 92324

[22] Filed: Sept. 17, 1973

[21] Appl. No.: 397,946

[52] U.S. Cl. .................................................. 32/32
[51] Int. Cl. ........................................... A61c 11/00
[58] Field of Search ........................................ 32/32

[56] References Cited
UNITED STATES PATENTS
| | | | |
|---|---|---|---|
| 3,478,431 | 11/1969 | De Pietro | 32/32 |
| 3,593,424 | 7/1971 | Lee | 32/32 |

Primary Examiner—Robert Peshock
Attorney, Agent, or Firm—Knobbe, Martens, Olson, Hubbard & Bear

[57] ABSTRACT

A jaw movement simulator comprising a maxillary frame and a mandibular frame and including two irregular five surface guide boxes on the maxillary frame enclosing two spherical styluses on the mandibular frame, to simulate the hinge axis movements of the temporo-mandibular joints. The guide boxes on the maxillary frame are formed by adjustable walls which limit and control the movements of the two styluses in three dimensions. The relative motion of the simulator produces a rhomboid configuration on a horizontal plate positioned at the forward region of the instrument. The outer walls of the guide boxes are constructed to restrain lateral shifting of the styluses when the instrument is simulating the protrusive movement. A pair of horizontal cup-end shafts colinear with the centric relation position of the axis in the guide boxes are adjustable inwardly to serve as retainers to hold the two styluses in fixed positions relative to the guide boxes so that the two frames of the instrument can only make rotational movement about the hinge axis in centric relation position. A lower (mandibular) frame with two spherical styluses, an unadjustable, fixed distance apart to create an axis to simulate the hinge axis of a human mandible.

27 Claims, 11 Drawing Figures

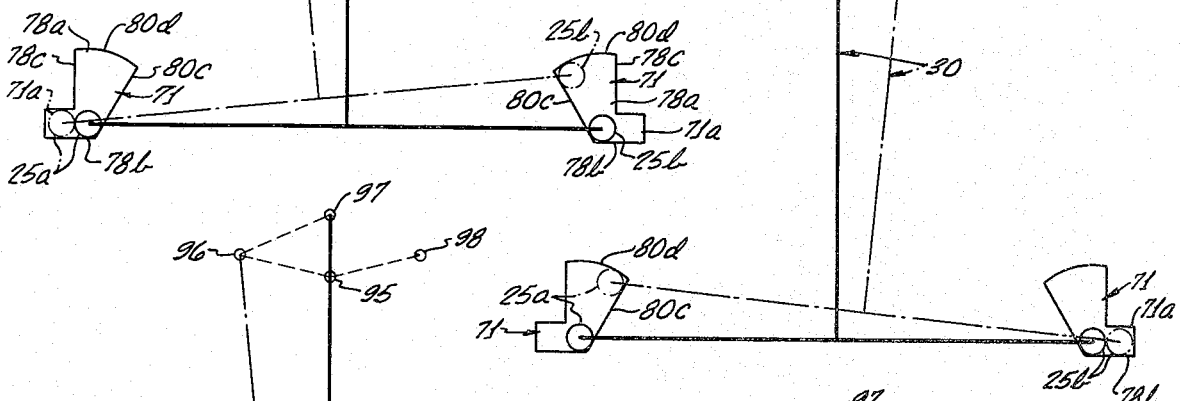
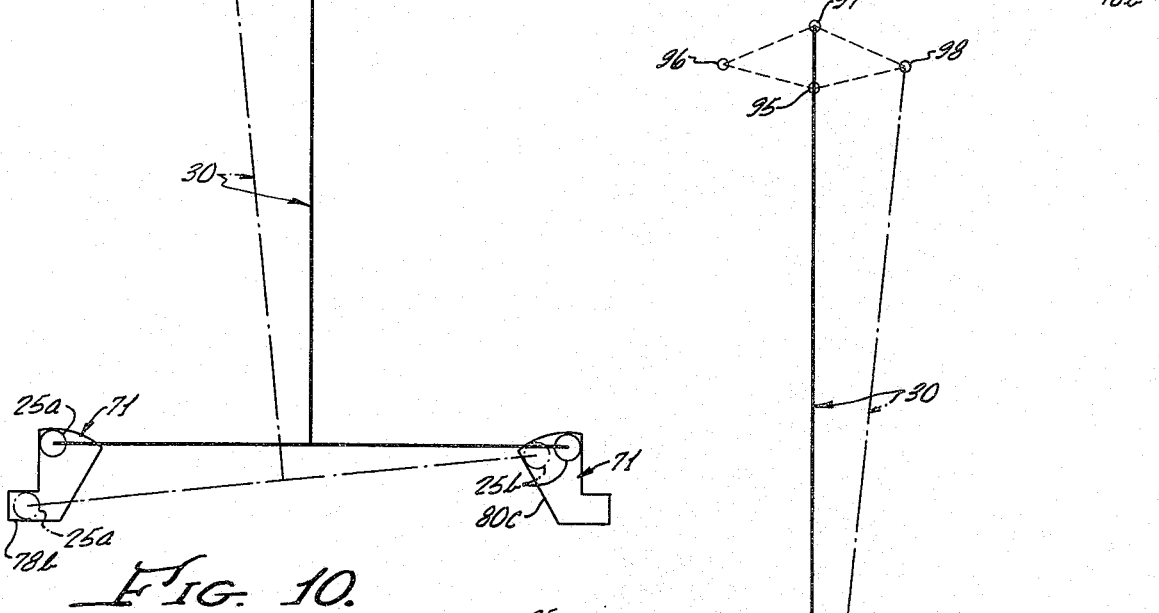
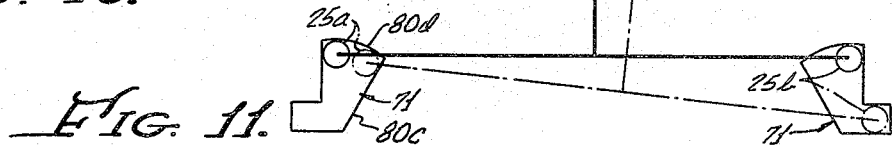

JAW MOVEMENT SIMULATOR

This invention relates to dental apparatus and particularly to an improved jaw movement simulator.

The study of jaw movements and the development of instruments for simulating such movements for use in practical dentistry has increased in recent years and a number of forms of instruments are available. One type of apparatus is that disclosed in several patents to Robert L. Lee, particularly U.S. Pat. No. 3,452,439. In accordance with Lee's method, dynamic movements of the patient's jaws are recorded and from this information analog hinge axis movements are formed bby three dimensional engravings in plastic blocks which when properly used in a dental articulator will simulate if not essentially duplicate particular jaw movements. The apparatus and method employed is very precise and provides excellent results. Although there are some limitations concerning providing the full range of a patient's jaw movements. Unfortunately, however, the apparatus and the method of operating it is relatively expensive such that the equipment is most practical for specialists, University research centers and other such large facilities, but the cost is prohibitive for the typical practicing dentist. Also even if a dental school might have apparatus of the type disclosed by Lee, individual students may not have much opportunity to utilize the equipment. Much of the cost of the Lee method is in preparing individual plastic molds or blocks to duplicate each patient's jaw hinge movements.

Another type of jaw movement simulator available is that which does not attempt to duplicate the patient's jaw movements, but only provides some approximation of the movements. in this approach, metal units having only three walls are provided to guide the movement of the jaw frames when the simulator is used. The cost of such units is sufficiently low that many of the units are in use by practicing dentists throughout the country and are also used in dental schools. A major shortcoming of such devices, however, it that they do not simulate all of the movements of the human jaws. Instead they provide a general approximation that can be of some help to a dentist in making dental prosthetic devices. However, a need exists for improving such instruments so that they will provide more accurate simulation of the patient's jaw movements while still keeping the cost of the equipment relatively modest.

The protrusive movement of the human mandible is that in which the lower jaw is thrust straight forward from the centric relation position. However, moving the upper structure of a simulator rearward accomplishes the same result. In normal healthy joints the ligaments, bones, and muscles of the jaws do not ordinarily allow the condyles of the mandible to shift back and forth laterally when the lower jaw is moving in the protrusive direction.

In the present invention, irregular guide boxes for the simulator styluses are formed with five surfaces which control and limit the stylus movements in all directions as long as the styluses are both in constant contact with the upper guide surfaces. The lower sides of the guide boxes are open of necessity to receive the styluses. One of the important portions of the guide boxes of this instrument are the outer guide surfaces which engage the outer sides of the styluses and particularly the portion of the outer guide surfaces which are foward from the centric relation position, or in other words, those portions of the outer guide surfaces which engage the styluses when the styluses are moving in the protrusive direction. These outer guide surfaces are generally perpendicular to the hinge axis when the axis is in centric relation position. The outer guide surfaces are positioned so that they limit or prevent lateral back and forth shifting of the styluses when the instrument is simulating a normal protrusive movement.

In order for the instrument to simulate right and left border movements of the mandible, the rear portions of the outer guide surfaces are positioned outward farther than the front protions of the outer guide surfaces. This allows one stylus to move outwardly while the other stylus moves forward and inwardly along its associated inner guide surface.

When the instrument is simulating movements intermediate to straight protrusive and right and left border, the stylus on the side to which the lower frame has moved does not move outwardly or go in uncontrolled ambiguous movements as other simulators do. Instead the stylus on the side to which the lower frame has moved reverses its direction and returns along the protrusive pathway on that side until it gets near centric position and then it moves outwardly on the border pathway. Concurrently the stylus on the other side simply moves inwardly along the front and upper guide surfaces until it is stopped by the inner guide surface on that side and the instrument has then arrived at a border position. This explains the rhombus geometrics observed in patients as they relate to condylar axis movements of the mandible.

A simulator constructed in this fashion enables the instrument to closely simulate the jaw movement of a patient. Evidence of this is obtained by attaching a vertical scribing stylus to the forward portion of the jaw frame supporting the guide boxes and having the end of the scribe trace a geometric pattern on a horizontal plate supported by the other frame of the simulator while moving the simulator jaw frames through the border movement paths. A rhomboid or diamond-shaped configuration will be obtained which closely approximates that of a patient's jaw movements, giving a total envelope of motion.

In accordance with the present invention, it has been discovered that a patient's jaw movements can be more accurately simulated by the use of five guide surfaces for each stylus rather than three as is present in other simulators. In a preferred form of the invention, two irregular boxes guide the movement of the mandibular frame, each of the boxes being formed of a primary guide housing and a secondary guide member. The primary housing includes portions defining a rear guide wall, an upper guide wall and an outer guide wall, and is mounted on the upper frame of the simulator to be rotatably adjustable about the hinge axis centric relation postion. The secondary guide member includes portions defining an inner guide wall and a front guide wall. The secondary guide member is mounted on the primary housing in a manner to enable the inner guide wall angle to be adjusted with respect to the other guide walls.

There are also provisions for allowing the styluses to demonstrate immediate horizontal side shift from centric relation position, a movement often observed in human jaws. The instrument is also provided a centric relation index pin and a mating key slot for positive identification of centric relation position between the maxillary and mandibular frames of the instrument when the side shift adjustment is being used.

It has been commonly believed and taught in dental textbooks up to the present time that in dental simulators utilizing spherical styluses to simulate the patients horizontal axis, there must be provisions made to adjust the center of center distance of the spheres to correspond to the "intercondylar distance" for each patient and this distance must be recorded as one of the parameters of adjustment of the instrument. According to this instrument, the spherical styluses are used to create a simulated horizontal axis only, and do not necessarily correspond to the patients condyles per se, therefore it is not important to have the styluses be adjustable. There is an advantage to having the styluses be an unadjustable fixed distance apart, because it reduces the amount of time and work in setting the instrument. Another advantage of the fixed styluses is that there are no measurement records to be kept when a standardized distance is used. It is also a great advantage in teaching students by reducing the complexities of the instruments. It also adds to the preciseness of the instrument to have the styluses fixed in relationship to each other.

For a more thorough understanding of the invention, refer now to the following detailed description and drawings in which.

Figure 7:
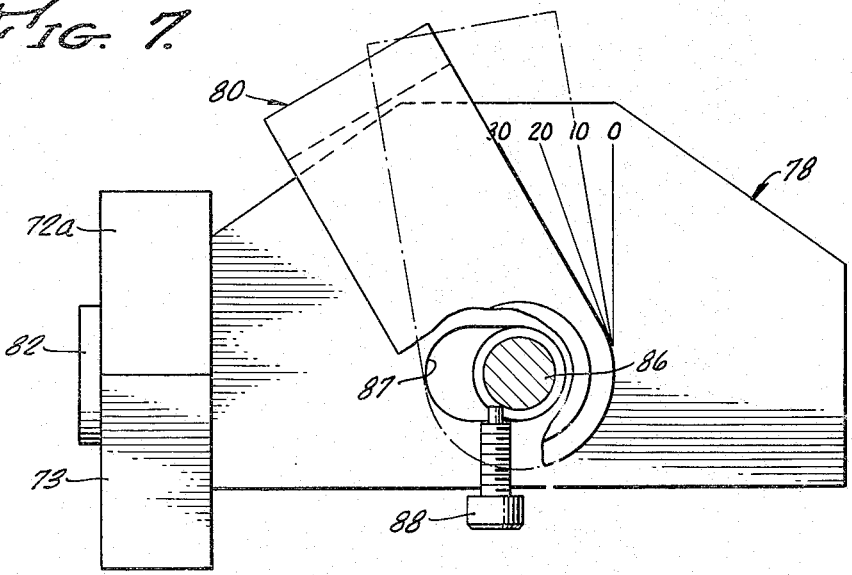

FIG. 7 is a view of the top side of the primary member of one guide assembly illustrating the adjustability of the secondary member; and FIGS. 8–11 are schematic views illustrating the movement pattern of the lower jaw frame with respect to the upper jaw frame of the simulator with the inner guide wall being oriented so as to allow maximum border movement of the lower frame relative to the upper frame.

Figure 1:
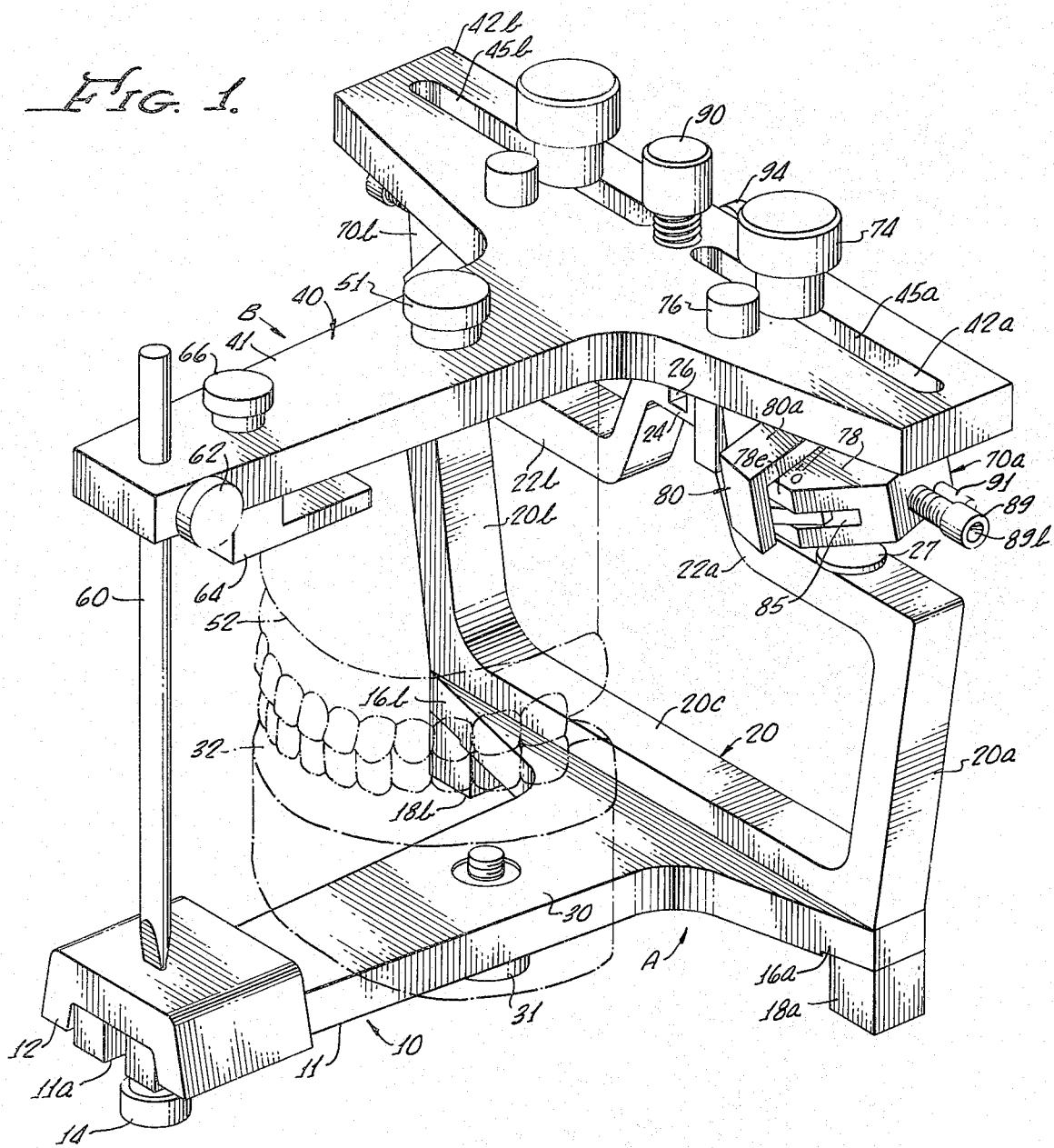
FIG. 1 is a perspective view of the assembled instrument of the invention.
Figure 2:
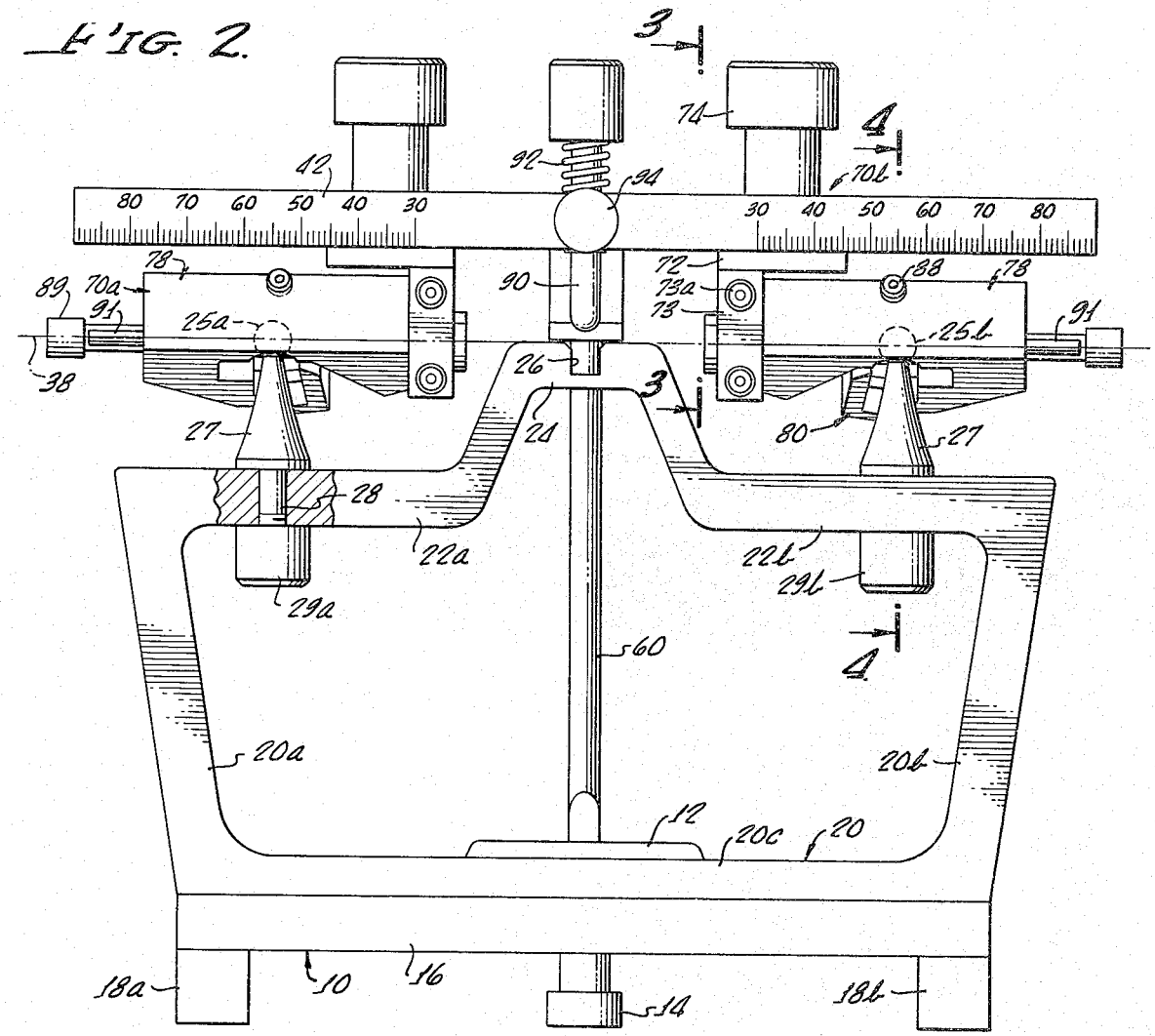
FIG. 2 is a rear elevational view of the instrument.

Referring now to FIGS. 1 and 2, it may be seen that the instrument includes a lower frame or assembly A and an upper frame or assembly B which respectively simulate the lower and upper jaws of a human. In the position illlustrated, the upper assembly B can be pivoted on the lower assembly A which is reverse to the human mandible or lower jaw which slides with respect to the maxilla or upper jaw, however the relative motion between the two frames is the same.

The lower assembly A includes a generally T-shaped base member 10 having a forward arm 11 formed with an elongated slot 11a in its forward end. An incisal pin rest plate or pad 12 having a generally U-shaped fits over the end of the forward arm 11 with its legs depending as illustrated. A screw 14 extends through the slot 11a and is threaded into the rest block 12 to secure the rest block to the base 10 and to also serve as one of three legs for the base.

The rear portion of the forward arm 11 branches off into two outwardly extending arms 16a and 16b which are supported by a pair of short legs 18a and 18b. Mounted on top of the base arm 16a and 16b is a closed loop vertical frame member 20 having two approximately vertical posts 20a and 20b which diverge outwardly slightly in an upward direction from a horizontal bottom beam 20c. The tops of the posts 20a and 20b are joined by a lateral truss 22 having left and right-hand portions 22a and 22b and being joined by a raised center portion or bridge 24.

The lower assembly also includes a pair of spherical styluses 25a and 25b which represent the simulated horizontal or hinge axis of the condyles of a human. The styluses are supported above the respective lateral truss portions 22a and 22b a fixed distance apart. Each stylus is supported on a vertically extending conical base 27, as seen in FIG. 2. A vertical shaft 28 attached to the conical base 27 extends through the respective lateral truss portions and is threaded on its lower end. A knurled nut 29a is mounted on the screw to securely fix the styluses to the truss 22. A flat mounting surface 30 is provided on the upper surface of the forward arm 11 in the intermediate portion thereof. A screw 31 projects upward through an opening in the arm 11 for attaching a dental mounting plate schematically illustrated at 32. Suitable additional mounting means not shown may be provided for securing the dental plate as necessary.

In the bridge 24 of the vertical frame member 20, a slot 26 is formed as a centric notch. The height of the styluses 25 is such that their radius centers form a horizontal or hinge axis 38 which is aligned with the upper surface of the bridge 24 and the entry to the slot 26.

The upper assembly B of the articulator includes an upper frame member 40 integrally formed from a single metallic member having a generally T-shaped configuration much like that of the lower base 10. In the upper frame 40, the forward arm is identified as 41, the outer arms as 42a and 42b respectively. The outer arms have lateral slotways 45a and 45b.

Near the forward end of the forward arm 41 is a vertical opening through which extends an incisal rest pin 60. A set screw 62 extends through the side of the arm 41 to lock the rest pin 60 in a selected position of vertical adjustment. As seen from FIG. 1, the lower end of the rest pin 60 engages the upper surface of the rest block 12 on the lower assembly.

A horizontal flag 64 used to indicate the horizontal plane of reference is attached to the forward end of the arm 41 immediately to the rear of the incisal pin 60. As seen the flag extends below the arm and is attached to the arm by means of a suitable fastener 66. The undersurface of this flag is on the same horizontal plane formed by the horizontal axis of the guide housings at centric relation position.

The forward arm 41 on its undersurface intermediate its length, has a mounting surface 49, FIG. 7, which is adapted to receive a mounting plate for a maxillary dental cast schematically illustrated at 52. A screw 51 is provided for assisting in securing the casts to the upper frame 40.

Figures 3, 4:
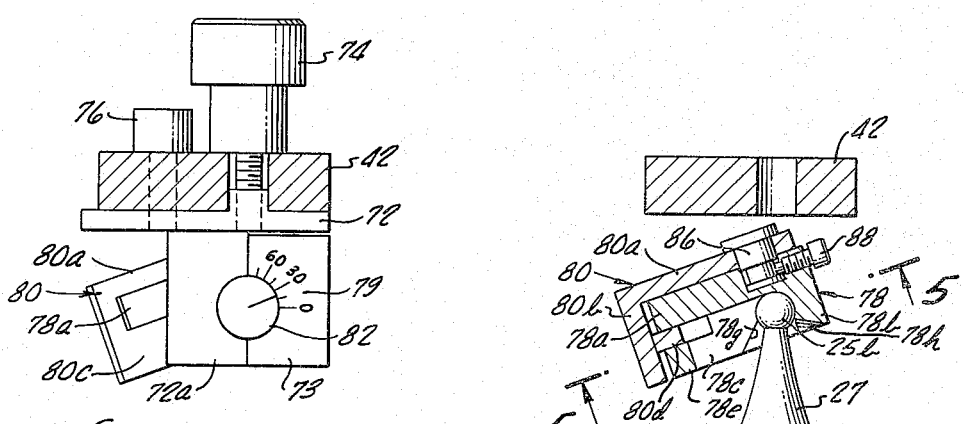
FIG. 3 is a cross-sectional view along the line 3—3 illustrating the adjustable mounting arrangement for one of the stylus guide assemblies.
FIG. 4 is a cross-sectional view on the line 4—4 illustrating the adjustable mounting arrangement for the secondary member of one of the guide assemblies.

Attached to the outer arms 42a and 42b of the upper jaw frame assembly are a pair of guide assemblies 70a and 70b which cooperate with the styluses 25a and 25b of the lower jaw frame. Each guide assembly includes a mounting plate 72 located immediately beneath the arm 42 and having a threaded opening in which is received a mounting screw 74. An entire assembly 70 may be slid laterally in the slotways 45 to fit an axis transfer bow, not shown because it is a conventional item. The screw 74 clamps the plate 72 in the desired location. Scales along the rear edge of the outer arm 42 may also be used for positioning. An adjustable dowel pin 76 shown in FIGS. 1 and 3 cooperates with a hole in a support plate 72 to laterally position the support plate in its usual mounting position to cooperate with the stylus on the lower frame. Referring to FIG. 3, the support plate 72 includes a trunion portion 72a to which is attached a mating trunion member 73 by suitable fastening elements 73a seen in FIG. 2.

Figure 5:
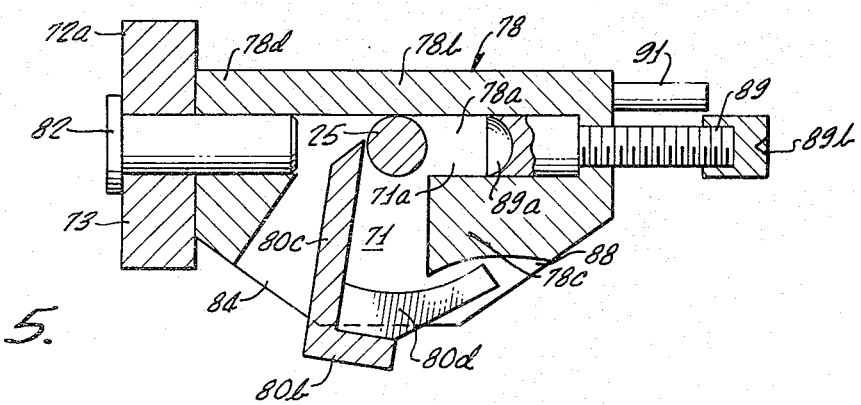
FIG. 5 is a cross-sectional view on line 5—5 of FIG. 4 illustrating the configuration of the guide area.

Each guide assembly 70 includes a pair of irregular five wall guide boxes 71 whose walls are formed by a primary guide housing 78 and a secondary member or housing 80. Referring to FIG. 5 as well as to FIGS. 1–4, the primary guide housing 78 presents a generally flat upper wall 78a, a generally flat rear wall 78b, and a generally flat outer wall 78c. The primary guide housing 78 also includes a mounting end 78d having a retained cup-end shaft or pin 82 which is gripped by the trunions 72a and 73. It will be understood that the primary guide housing 78 is joined to the pin 82 to act as one piece, and hence the entire guide housing can be rotated horizontally as desired with the pin 82 and clamped in this position by means of the fastener 73a. An angular scale 79 is formed on the trunion 73 as shown in FIG. 3 to indicate the angular orientation of the guide housing 78 to the horizontal plane.

The secondary guide housing 80 is an irregularly shaped element preferably formed as an integral piece which fits onto the primary housing 78 by way of a slot 84 in the housing 78. The secondary housing 80 includes a horizontally flat upper support arm 80a, (when viewed in the orientation of FIGS. 1 and 4) a vertical wall 80b, a flat vertically oriented but horizontally extending wall 80c attached to the vertical wall 80b, and a generally flat, curved, finger-like front guide wall 80d extending outwardly from the walls 80b and 80c. The flat support arm 80a is mounted on the primary guide housing with a pivot pin 86 by means of a set screw or other suitable means not shown. Referring to FIG. 7, the opening 87 through which the pin 86 extends is elongated laterally so that the pin 86 carrying the inner guide wall 80c may be moved inwardly a small amount, such as about 2 mm. An adjustment of this type for both right and left guides thus may provide a total horizontal side shift of 4 mm. A set screw 88 extending through the rear wall 78b of the primary guide housing 78 engages either one side or the other of the pivot pin 86 to laterally fix the pin 86 and the secondary guide housing 80 and also to prevent rotation once the desired angular setting has been made. A suitable scale is provided on the upper side of the primary guide housing 78 for angularly positioning the seconday housing 80, as may be seen from FIG. 7. The vertical support wall 80b of the secondary housing 80 extends adjacent the forward edge of the housing 78 and the internal surface of the horizontally extending vertically oriented wall 80c forms the inner surface for the guide box 71.

The housing 78 includes a wall 78e as an extension of the wall 78c which forms a forward wall of the guide box 71. The finger 80d on the member 80 extends into a slot 85 in the lower portion of the wall 78e so that the inner side of the finger 80d forms the front guide wall of the guide box 71. As can be seen from FIG. 5, an arrangement such as this insures that the front wall of the guide box 71 is completely closed at all times regardless of the angular position of the secondary member 80.

Figure 6:
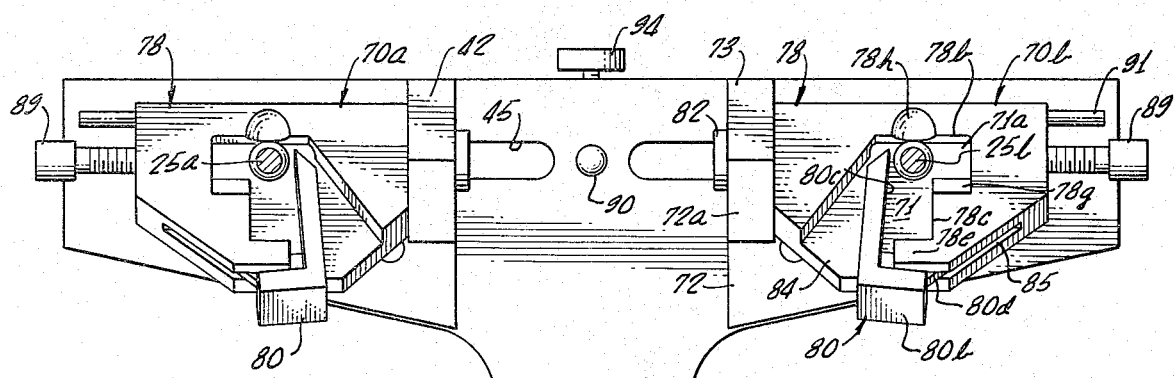
FIG. 6 is a plan view of the underside of the upper jaw frame assembly.

Referring to FIGS. 1 and 6, the guide assembly 70 also includes a shaft 89 extending through the outer wall 78c of the housing 78. As better seen from FIG. 5, a dogleg extension 71a of the guide cup 71 is formed in the outer guide wall 78c and the enlarged inner end of the shaft 89 extends into this extension. The rest of the shaft is threaded which permits the shaft 89 to be threaded in and out of mating threads in the housing 78 as desired. The shaft has a recess 89a on its inner end adapted to engage the stylus 25 of the lower jaw frame assembly in the event it is desired to fix the guide assemblies relative to the styluses for simple centric relation horizontal axis action. The diameter of the extension 71a is of course sufficient to permit the stylus 25 to be moved into that area. As can be seen from FIG. 6, the inner end of the extension is partially open on the lower side, like the rest of the box area, to receive the stylus shift 28 when the stylus is moved into the extension. The housing surface 78 adjacent the extension is angled to receive the stylus shaft 28. Although the stylus shaft 28 can be shifted into the opening in the lower side of the extension, it should be noted that the opening is smaller than the diameter of the enlarged inner end of the shaft so that the shaft is closely confined and the stylus is positively retained against the box upper and rear walls when the shaft is used to lock the stylus for simple pivoting or hinging action. A recess 78h formed in the housing rear wall 78b receives the stylus shaft 28 during such pivoting.

The outer end of each shaft 89 has a dimple 89b which conveniently forms an axis reference point for a type of face bow used to make jaw measurements. Adjacent each shaft 89 is a pin 91 extending into the guide member 78, such pin also serving as a reference point for jaw measuring equipment.

The upper assembly B also includes a centric pin 90 seen in FIGS. 1 and 2, which extends into the central portion of the arm 42 of the upper frame 40 to cooperate with the centric slot 26 in the lower frame. The centric spring is loaded by a spring 92 into a position where it does not engage the slot 36 so that the centric pin can be conveniently depressed into the slot for temporary alignment of the upper and lower frames and then released. The spring will then retract the pin. A set screw 94 extending through the rear face of the frame arm 42 is provided to lock the centric pin in a depressed, compressed position if desired. The centric pin and mating key assembly is used primarily when the side shift settings are in use so that the original alignment of the frames A and B can be ascertained at any time without disturbing the other instrument settings.

Operation

When not being operated, the upper and lower jaw frame assemblies of the simulator are normally positioned as shown in FIG. 1, although they can be inverted. In operation, the assemblies are usually held in the hands with the upper assembly inverted enough to permit the user to easily view the guide boxes 71 and the styluses 25 as the lower assembly is pivoted and the styluses shift in the boxes. The dental casts 32 and 52 are mounted to the upper and lower frames with the attaching screws 31 and 51 and utilizing standard techniques. The incisal pin 60 is vertically adjusted to fit the particular dental casts. The centric pin is operated to properly position the upper frame with respect to the lower frame. The primary guide housings 78a and 78b are adjusted for their desired angular orientations about the horizontal axis pins 82 using the scale illustrated in FIG. 3, and the secondary guide members 80 are angularly oriented on the primary guide housing to position the inner guide wall 80c of the guide box 71, utilizing the scale illustrated in FIG. 7. Also the guide assemblies 70a and 70b are laterally adjusted to fit over the styluses as illustrated in FIG. 2. This is quickly accomplished by use of the pins 76, FIG. 1, which cooperate with holes in the support plates 72 since the styluses are fixed. When the stylus 25 is positioned engaging the upper wall 78a and rear wall 78b of its guide box 71 and the other stylus similarly positioned in the other guide box, and the centric relation index pin fully engages the centric slot, the instrument is in centric relation position. If no horizontal side shaft movement from the centric relation position is desired, the pivot pin 86 shown in FIG. 4 is positioned with respect to the retaining pin 88 such that the inner wall 80c prevents such movement. However, if some side shift is desired from the centric position, the pivot pin 86 is positioned on the opposite side of the retaining pin.

The various settings of these adjustable aspects of the instrument are approximate settings based on information obtained from observing and measuring the patient's jaw movements through known techniques. For example, left and right lateral check bites are utilized to facilitate the angular orientation of the secondary housing 80 and the location of the retaining pin 88. Also the angular orientation of the guide assemblies about the centric axis can be determined through known techniques of protrusive check bite. In addition, jaw movement writing devices known as "pantographs" may be used to obtain setting information.

As indicated above, one of the aspects which distinguishes this invention over earlier instruments is that it has been determined that the styluses need not be adjustable in their lateral separation. Instead the desired simulated movement can be obtained without directly relating that measurement to the patient's actual jaw width.

More significantly, it has also been determined that jaw movements cannot be properly simulated unless the guide boxes 71 are arranged to prevent lateral shifting of the horizontal axis relative to the guide boxes when the instrument is simulating protrusive movement. When the upper and lower assemblies of the simulator move in the protrusive direction, the outer walls 78c prevents lateral shifting. In the present invention, if right or left movement of the lower assembly with respect to the upper assembly is attempted when the lower assembly is in a protrusive position, what actually happens is that the stylus on the side toward which the jaw is moving begins to move back towards the centric postion. Concurrently the other stylus simply moves inwardly unitl it is stopped by the inner guide surface on that side. Evidence of this is suggested by the fact that when a scribe is secured to the upper jaw of a patient and allowed to trace its border path on a flat horizontal plate element secured to the lower jaw, a generally rhomboid or diamond-shape configuration is obtained. This condition is simulated in the present instrument by observing the path inscribed by a scribe attached to the incisal pin on its rest plate when the styluses are moved through the limits of their paths in the guide boxes 71. This condition is illustrated in FIGS. 8-11.

In FIGS. 8-11 the secondary guide member 78 is oriented such that the inner wall 80c is at an angle to allow the frames to pivot to the sides a maximum amount as well as straight ahead. The lower jaw frame in the solid line position of FIG. 8 is a schematic illustration of the styluses 25a and 25b positioned in the guide boxes 71 in the centric relation position wherein the styluses 25a and 25b are engaging the rear surface 78b of the guide box 71 and are laterally centered. In other words this is comparable to the lower jaw of a human being in its most retruded position. The incisal pin, or a scribe located where the incisal pin is situated is at a point 95 shown in FIG. 8 when the upper and lower frames are in the centric relation position.

The broken line position of the lower frame member in FIG. 8 shows the left border position, or maximum position to the left. The stylus 25a is still in engagement with the rear guide surface 78b as in the centric relation position although the stylus 25a has shifted outwardly into the extension area of the guide cup 71a. The stylus 25b engages the guide box inner surface 80c and front surface 80d. The scribe has traced a path to a point 96 which is the maximum left border position for this setting of the guide surface 80c.

In FIG. 9 the solid line position once again shows the styluses 25a and 25b engaging the rear surfaces 78b of the guide boxes 71 which is the centric relation position for the upper and lower jaw frame assemblies. In the broken line position the lower frame has moved to its maximum right border position. In doing this, the stylus 25b is still in engagement with the rear guide surface 78b although the stylus 25b has shifted outwardly into the extension area 71a of the guide box, while the stylus 25a has moved forwardly into contact with the guide box surface 80d and has shifted inwardly into contact with the inner guide surface 80c. The scribe has moved to point 98. If the upper and lower assemblies are now returned to the centric position, the scribe would move from point 98 to point 95.

In the schematic illustrations of FIGS. 10 and 11, the frames are shown in solid lines moved from centric relation to extreme protrusive and the scribe moved from point 95 to point 97. It should be noted that the lower frame 30 cannot be moved directly laterally from protrusive positions because such movement is prevented by the outer walls 78c of the guide boxes. While in the maximum protrusive position, if the lower jaw frame is pivoted to the left, or in other words to move the lower frame to the position made by the scribe identified as point 96, the stylus 25a must slide back toward its starting position against the rear guide surface 78b and then shift outwardly into the box slot 71a while the stylus 25b moves inwardly to engage the inner guide surface 80c. This condition is shown in broken lines in FIG. 10.

If, referring to FIG. 11, the lower jaw frame 30 is pivoted to the maximum right border position from extreme protrusive position, the stylus 25b must slide back toward its starting position against the rear guide surface and then shift ourwardly into the box slot 71a. Simultaneously, the stylus 25a moves inwardly to engage the inner surface 80c while still engaging the forward surface 80d. This condition is shown in broken lines, and it can be seen that the scribe has moved from point 97 to point 98. The smooth generally flat surface of the guide boxes permit smooth transitional movement from a protrusive position into a right or left lateral position. The presence of the outer wall is mandatory and it is this aspect which has previously not been recognized in connection with prior art simulators in that they do not have such outer guide walls which prevent direct horizontal shifting of the jaw frames while simulating protrusive movements.

Thus it can be seen from FIG. 9 a generally rhomboid or diamond-shape is traced by the scribe. As explained above this is the movement path obtained by most normal human subjects. Accordingly it is believed that the simulator is properly constructed and more specifically that the guide boxes on the upper frame member are properly constructed. When the components are in a protrusive position and it is attempted to move the lower frame either to the right or to the left with respect to the upper frame, the outer walls 78c prevent such movement. Instead, to obtain right and left jaw movement simulation while in protrusion it is necessary to have one or the other stylus to return toward the centric position while the other remains near the protrusive position or move inwardly to contact the inner guide surface. In other words there is a rather complex movement as opposed to a straight lateral shift.

While the simulator described is not intended to duplicate the jaw movement of any individual it does very closely simulate such movement if care is taken in making initial measurements of the jaw movement and to correspondingly properly orient the guide boxes on the simulator. The representation obtained is much more accurate than that obtained in prior art simulators of this general type.

As indicated above, the secondary housing can be adjusted to move the inner guide wall 80c; however a similar generally rhomboid pattern is obtained, also, the pivot pin 88 for the secondary guide housing 80 can be moved to allow for limited immediate lateral shifting. This would change the movement paths somewhat from that illustrated in FIGS. 9–11, however, because of the generally perpendicular forward portion of the outer guide surface 80c the generally rhomboid pattern would still be obtained.

As also mentioned above the simulator conveniently includes the shafts 89 which enable the guide boxes to be clamped with respect to the styluses if straight hinging action is desired for various dental purposes.

What is claimed is:

1. An instrument for simulating human jaw movements including:
   a mandibular frame;
   means on said frame to define an axis that simulates the hinge axis of a human mandible;
   a maxillary frame; and
   guide means on said maxillary frame cooperating with the mandibular frame to permit rotational movement of the mandibular frame on the maxillary frame about said axis and controlled and limited sliding movement of said axis while simulating right and left jaw movement and preventing direct lateral shifting of the axis means when the frames simulate protrusive movements, said guide means being formed to permit smooth transitional movement from a protrusive position into a right or left lateral position.

2. The instrument of claim 1 wherein one or more of the walls of the guide boxes are adjustable with respect to the other walls.

3. The instrument of claim 1 wherein said guide means includes a pair of irregular five walled guide boxes which receive means defining said simulated axis.

4. The instrument of claim 3 wherein the walls of said guide boxes are generally flat.

5. An instrument for simulating jaw movements including:
   a frame to represent a human mandible;
   a pair of spherical styluses mounted in spaced relation on the frame to define an axis that simulates the hinge axis of a human mandible;
   a frame to represent a human maxilla; and
   a pair of guide boxes mounted on the maxillary frame in a manner to receive the styluses, each of said guide boxes having means defining a rear guide surface, a forward guide surface, an inner guide surface, an outer guide surface and an upper guide surface with the lower side of the guide box being open to receive one of said styluses, said outer surface including a forward portion oriented generally perpendicular to the rear guide surface, said forward portion being laterally positioned so that when the styluses are simulating protrusive movement, the styluses are restrained from shifting directly laterally by said outer guide surfaces.

6. The instrument of claim 5 wherein said rear upper and outer guide surfaces are fixed with respect to each other.

7. The instrument of claim 5 wherein the distance between said styluses is fixed.

8. The instrument of claim 5 wherein the guide boxes are formed by a primary housing incorporating the upper surface, the rear surface and the outer surface, said primary housing further having a horizontal pin on which the primary housing is rotated, and a secondary member which is pivotally mounted on the primary housing and includes a wall forming said inner guide surface and a wall forming said forward guide surface.

9. The instrument of claim 8 wherein said secondary member is laterally adjustable so as to permit immediate lateral shifting of the mandibular from the centric position.

10. The instrument of claim 9 wherein said secondary member is mounted on a vertical pivot pin which extends through an elongated opening in the primary housing, and including a retaining screw which is mounted in said primary housing and extends into the opening to engage the pivot pin and hold the pin in one end or the other of said opening so as to permit said immediate lateral shifting.

11. The instrument of claim 5 wherein the outer surface for each guide box includes a rear portion which extends outward laterally from the rear portion of the outer wall so as to permit a stylus to move into the area formed by the rear portion of the outer wall.

12. The instrument of claim 11 including a horizontal shaft mounted in the rear portion of said outer wall of each guide box and extending into the guide box, said shafts being adjustable in the lateral direction so that in effect each forms an adjustable outer wall for the rear portion, said shafts also being movable inwardly to engage the styluses and the inner ends of the shafts being formed to clamp the styluses in centric postion so that there can be no sliding movement but only rotation about the horizontal axis through the shafts and the styluses.

13. A pair of spaced guide assemblies having guide boxes for engagement with a pair of spherical styluses mounted on a jaw movement simulator, each of said guide boxes comprising means defining a rear wall, a forward wall, an inner wall, an outer wall, and an upper wall, with the lower side of each guide box being open to receive its stylus, each of said outer walls including a forward portion oriented to prevent direct lateral displacement of the styluses when the styluses are simulating protrusive movements with respect to the guide boxes.

14. A jaw movement simulator comprising:
 a mandibular frame having a pair of spherical styluses mounted thereon to simulate the horizontal hinge axis;
 a maxillary frame having a pair of guide boxes for receiving said styluses for sliding, hinging action;
 each of said guide boxes including a rear wall, and an outer wall adjacent the rear wall, said outer wall including means which are laterally adjustable and adapted to engage a stylus and retain the frames in centric relation position while permitting hinging of frames.

15. The simulator of claim 14 wherein said adjustable means comprise a shaft which extends through the outer wall, said shaft having an inner end concave surface which conforms to the stylus to prevent sliding of the stylus while permitting hinge movement.

16. A jaw movement simulator comprising:
 a mandibular frame having a pair of spaced spherical styluses mounted thereon;
 a maxiallary frame;
 a pair of guide assemblies on said maxillary frame each having a box for receiving one of said styluses, and permitting limited lateral shift of the stylus in the box; and
 each of said guide assemblies including a primary housing forming the rear and upper walls of said box, a secondary member mounted on a pin which extends through a laterally extending elongated slot in the primary housing such that the pin can be positioned in either end of the slot, said secondary member having a wall forming an inner wall of said guide box and means for retaining the pin in the end of the slot selected, whereby lateral side shift adjustability of the inner wall is obtained.

17. An instrument for simulating jaw movements including:
 a frame to represent a human mandible;
 a pair of spherical styluses mounted in spaced relation on the frame to define an axis that simulates the horizontal hinge axis of a human mandible;
 a frame to represent a human maxilla; and
 a pair of spaced guide assemblies mounted on the maxillary frame, each including means defining an inverted guide box to receive respectively one of the styluses, each of said guide boxes has an upper wall and a series of side walls forming an irregular cross-section including a rear wall, an outer wall having a forward portion generally perpendicular to the rear wall, an inner wall extending from the rear wall and spaced from and diverging from the outer wall in the forward direction, and a forward all extending between the forward ends of the outer and inner walls, said outer wall having a rear portion spaced outwardly from the forward portion to form a somewhat dogleg extension of the guide box cross-section.

18. The instrument of claim 17 wherein each of said assemblies includes a shaft extending through said rear portion of the outer wall into the dogleg extension of the guide box cross-section, the shaft being adjustable as to the amount that it extends into the guide box so that the inner end of the shaft in effect forms an adjustable outer wall for said rear portion, the inner end of the shaft conforming to the shape of said stylus.

19. The instrument of claim 18 wherein said rear portion of the outer wall is partially open on its lower side to receive means supporting a stylus as the stylus is moved into the extension, and said rear portion is formed so that when the shaft is adjusted inwardly to engage the stylus and clamp it in centric position the stylus is positively retained in engagement with the rear and upper guide box surfaces.

20. The instrument of claim 19 wherein the upper and side walls of said rear portion surrounds more than half of the shaft circumference.

21. In an instrument for simulating jaw movements including:
 a guide box having an upper wall and a series of side walls forming an irregular cross-section including a rear wall, an outer wall having a forward portion generally perpendicular to the rear wall, and inner wall extending from the rear wall and spaced from and diverging from the outer wall in the forward direction, and a forward wall extending between the forward ends of the outer and inner walls, said outer wall having a rear portion spaced outwardly from the forward portion to form a somewhat dogleg extension of the guide box cross-section.

22. An instrument for simulating jaw movements comprising:
 a lower frame to represent a human mandible;
 a pair of spherical styluses mounted in spaced relation on said frame to define an axis that simulates the horizontal hinge axis of the human mandible;
 an upper frame to represent a human maxilla; and
 a pair of guide assemblies mounted on the maxillary frame in spaced relation to receive respectively one of said styluses, each of said assemblies including trunion means attached to said upper frame, a primary guide housing fixed to a horizontally extending pin which is rotatably mounted in said trunion means, said housing having wall means forming surfaces of an irregular shaped guide box for receiving one of said styluses, said surfaces including an upper surface, a rear surface, and an outer surface extending generally perpendicular to said rear surface, a rear portion of said outer surface being positioned outwardly an additional amount from the forward portion of the outer surface, a secondary guide housing attached to a vertical pin which extends through the top surface of the primary guide housing and is pivotally mounted therein such that the secondary guide housing is angularly adjustable with respect to the primary housing, said secondary housing including a wall forming an inner surface of said guide box which is angularly adjustable with respect to said rear surface, and said secondary housing has a wall forming a forward surface of said box which extends between the forward ends of said outer and inner box surfaces, said forward surface including a portion which cooperates with said outer wall so that the forward portion of the box is completely enclosed regardless of the angular position of said inner surface.

23. A method of simulating movement of a human mandible with a dental instrument having a maxillary frame and a mandibular frame, the mandibular frame having means forming a hinge axis and the maxillary frame having means for receiving the hinge axis means to permit sliding, hinging action between the frames, the method including the steps of:
permitting limited movement of the hinge axis means in forward and rearward directions;
permitting limited side movement of the frames when the frames are simulating non-protrusive positions; and
preventing direct lateral shifting of the hinge axis means when the frames are simulating protrusive movement.

24. A method of simulating movement of the hinge axis of the human mandible with an instrument having a manibular frame with a spaced pair of spherical styluses mounted thereon representing a hinge axis and a maxillary frame with a pair of spaced irregular shaped guide boxes mounted thereon to receive the styluses for permitting sliding hinging action of the frames, including the steps of:
utilizing spaced forward and rear guide surfaces for each of said guide boxes to permit limited movement of the frames from centric position to that simulating protrusive movement; and
utilizing an outer guide surface adjacent the forward wall to prevent direct lateral shifting of the mandibular frame relative to the maxillary frame while the frames are simulating protrusive movement.

25. A method of simulating movement of the human mandible with a dental instrument having upper and lower jaw frames comprising the steps of:
positioning a spaced pair of spherical styluses mounted on the lower frame within a spaced pair of guide boxes mounted on the upper frame which permit limited movement of the styluses in forward and rearward directions and limited side movement in the non-protrusive relation and prevent direct lateral shifting of the styluses when the styluses and guide boxes simulate protrusive movement; and
guiding the styluses in the guide boxes through the range of border movement permitted by the guide boxes.

26. The method of claim 25 wherein said guide box has five surfaces for controlling the movement of the styluses.

27. A method of simulating movement of a human mandible with a dental instrument having a maxillary frame and a mandibular frame, the mandibular frame having means forming a hinge axis and the maxillary frame having means for receiving the hinge axis means to permit sliding, hinging action between the frames, the method including the steps:
guiding movement of the mandibular frame so as to limit its forward and rearward movement from a centric relation positon to a protrusive relation position;
guiding the mandibular frame so as to permit limited side movement when the frames are simulating non-protrusive position; and
guiding the mandibular frame to prevent immediate lateral shifting of the hinge axis means when the frames are simulating protrusive movement.

* * * * *

REEXAMINATION CERTIFICATE (1763rd)

United States Patent [19]

Lee

[11] B1 3,896,550

[45] Certificate Issued   Aug. 4, 1992

[54] JAW MOVEMENT SIMULATOR

[76] Inventor: Robert L. Lee, 22937 Grand Terrace Rd., Colton, Calif. 92324

Reexamination Request:
No. 90/002,050, Jun. 12, 1990

Reexamination Certificate for:
Patent No.: 3,896,550
Issued: Jul. 29, 1975
Appl. No.: 397,946
Filed: Sep. 17, 1973

[51] Int. Cl.$^5$ ............................................. A61C 11/00
[52] U.S. Cl. ........................................ 433/57; 433/56
[58] Field of Search ................. 433/54, 55, 56, 57, 433/58, 59, 60, 61, 62, 63, 64, 65, 67, 68, 69, 73

[56] References Cited

U.S. PATENT DOCUMENTS

| | | | |
|---|---|---|---|
| 1,033,562 | 7/1912 | Eltner | 433/56 |
| 1,052,806 | 2/1913 | Evans | 433/73 |
| 1,055,718 | 3/1913 | Davis et al. | 433/58 |
| 1,070,123 | 8/1913 | Evans | 433/69 |
| 1,080,809 | 12/1913 | Burch | 433/56 |
| 1,497,259 | 6/1924 | Bonoff | 433/73 |
| 1,550,339 | 8/1925 | Branson et al. | 433/56 |
| 1,670,311 | 5/1928 | Musante | 433/55 |
| 1,684,393 | 9/1928 | Gysi | 433/58 |
| 1,703,105 | 2/1929 | Hawksworth | 433/56 |
| 1,705,223 | 3/1929 | McLean | 433/69 |
| 1,733,507 | 10/1929 | McCollum | 433/56 |
| 1,753,965 | 4/1930 | Ralph | 433/51 |
| 1,786,915 | 12/1930 | McLean | 433/73 |
| 1,815,956 | 7/1931 | Ralph | 433/58 |
| 2,119,896 | 6/1938 | van Dorn et al. | 433/57 |
| 2,235,524 | 3/1941 | Lentz | 433/58 |
| 2,237,050 | 4/1941 | Franwick | 433/57 |
| 2,491,136 | 12/1949 | Salzmann | 433/72 |
| 2,603,869 | 7/1952 | Bjorklund | 433/56 |
| 2,621,407 | 12/1952 | Schlesinger | 433/57 |
| 2,648,130 | 8/1953 | Avery | 433/73 |
| 2,701,915 | 2/1955 | Page | 433/69 |
| 2,713,721 | 7/1955 | Page | 433/56 |
| 2,754,588 | 7/1956 | Corde | 433/60 |
| 2,806,284 | 9/1957 | Stuart | 433/69 |
| 2,814,876 | 12/1957 | Stuart | 433/69 |
| 2,816,360 | 12/1957 | Stuart | 433/50 |
| 2,909,837 | 10/1959 | Gerber | 433/57 |
| 3,019,530 | 2/1962 | De Pietro | 433/59 |
| 3,035,348 | 5/1962 | Page | 433/69 |
| 3,052,030 | 9/1962 | Spence | 433/56 |
| 3,056,210 | 10/1962 | De Pietro | 433/73 |
| 3,078,584 | 2/1963 | Cohn | 433/73 |
| 3,130,494 | 4/1964 | MacKay | 433/69 |
| 3,159,914 | 12/1964 | De Pietro | 433/56 |
| 3,159,915 | 12/1964 | Beu et al. | 433/57 |
| 3,206,852 | 9/1965 | Swanson | 433/56 |
| 3,218,716 | 11/1965 | Stuart | 433/73 |
| 3,225,096 | 12/1965 | Stuart | 433/56 |
| 3,256,523 | 6/1966 | De Pietro | 433/74 |
| 3,350,782 | 11/1967 | Guichet | 433/55 |
| 3,431,649 | 3/1969 | Guichet | 433/69 |
| 3,452,439 | 7/1969 | Lee | 433/55 |
| 3,490,146 | 1/1970 | Guichet | 433/69 |
| 3,577,639 | 5/1971 | Lee | 433/69 |
| 3,590,487 | 7/1971 | Guichet | 433/62 |
| 3,593,424 | 7/1971 | Lee | 433/55 |
| 3,624,906 | 12/1971 | Granger | 433/57 |
| 3,643,332 | 2/1972 | Lee | 433/73 |
| 3,694,919 | 10/1972 | Lee et al. | 433/55 |
| 3,708,882 | 1/1973 | Guichet | 433/56 |
| 3,750,289 | 8/1973 | Guichet | 433/56 |

FOREIGN PATENT DOCUMENTS

| | | |
|---|---|---|
| 243812 | 3/1911 | Fed. Rep. of Germany . |
| 413257 | 5/1925 | Fed. Rep. of Germany . |
| 4846190 | 7/1973 | Japan . |

OTHER PUBLICATIONS

Manual, "Instructions for the Aderer Simulator", (pp. 1–55), Adever.

Article, Gibbs and Messerman, "Jaw Motion During Speech", (pp. 104–112), American Speech and Hearing Assoc. Report No. 7.

Article, Lundeen and Wirth, "Condylar Movement Patterns Engraved in Plastic Blocks", (pp. 866–875), Jo. Prosthetic Dentistry, 12-1973, vol. 30, No. 6.

Article, Gibbs, Messerman, Reswick and Derda, "Functional Movements of the Mandible", (pp. 604–620), J. Prosthetic Dentistry, 12-1971 vol. 26, No. 6.

Article, Granger, "Practical Procedures in Oral Rehabilitation" (pp. 64 & 133), 1962.

Article, Lucia, "Modern Gnathological Concepts", (pp. 264–266), 1961.

Article, Kornfeld, "Mouth Rehabilition", (p. 12), 1967.

Article, Mack, "Gnathology—Journal of European Academy of Gnathology" (pp. 1–37).

TMJ, Price List, (7 pages).

Article, "The Gysi Face Bow", (pp. 1–27), The Dentist's Supply Co. of New York, 1928.

Article, Wadsworth, "Wadsworth Universal Articulator", (pp. 1–11), 1924.

Hanau Engineering Co., "Hanau Articulator Technique", (pp. 10, 11, 16–18) (3 pages of illustration).

Hanau Engrg. Co. Inc., Articulator Technique Series H 2, 96–01, pp. (Cover to 23) Published prior to 1970.

*Primary Examiner*—John J. Wilson

[57] ABSTRACT

A jaw movement simulator comprising a maxillary frame and a mandibular frame and including two irregular five surface guide boxes on the maxillary frame enclosing two spherical styluses on the mandibular frame, to simulate the hinge axis movements of the temporo-mandibular joints. The guide boxes on the maxillary frame are formed by adjustable walls which limit and control the movements of the two styluses in three dimensions. The relative motion of the simulator produces a rhomboid configuration on a horizontal plate positioned at the forward region of the instrument. The outer walls of the guide boxes are constructed to restrain lateral shifting of the styluses when the instrument is simulating the protrusive movement. A pair of horizontal cup-end shafts colinear with the centric relation position of the axis in the guide boxes are adjustable inwardly to serve as retainers to hold the two styluses in fixed positions relative to the guide boxes so that the two frames of the instrument can only make rotational movement about the hinge axis in centric relation position. A lower (mandibular) frame with two spherical styluses, an unadjustable, fixed distance apart to create an axis to simulate the hinge axis of a human mandible.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-13 and 15-27 are confirmed.

Claim 14 has been finally determined to be unpatentable, is cancelled.

* * * * *